United States Patent
Hansen et al.

(10) Patent No.: US 7,483,935 B2
(45) Date of Patent: Jan. 27, 2009

(54) SYSTEM AND METHOD TO IMPLEMENT A MATRIX MULTIPLY UNIT OF A BROADBAND PROCESSOR

(75) Inventors: Craig Hansen, Los Altos, CA (US); Bruce Bateman, Fremont, CA (US); John Moussouris, Santa Clara, CA (US)

(73) Assignee: Microunity Systems Engineering, Inc., Sunnyvale, CA (US)

(*) Notice: Subject to any disclaimer, the term of this patent is extended or adjusted under 35 U.S.C. 154(b) by 1152 days.

(21) Appl. No.: 10/233,779

(22) Filed: Sep. 4, 2002

(65) Prior Publication Data
US 2003/0110197 A1 Jun. 12, 2003

Related U.S. Application Data

(60) Continuation-in-part of application No. 09/922,319, filed on Aug. 2, 2001, now Pat. No. 6,725,356, which is a continuation of application No. 09/382,402, filed on Aug. 24, 1999, now Pat. No. 6,295,599, which is a continuation-in-part of application No. 09/169,963, filed on Oct. 13, 1998, now Pat. No. 6,006,318, which is a continuation of application No. 08/754,827, filed on Nov. 22, 1996, now Pat. No. 5,822,603, which is a continuation of application No. 08/754,827, filed on Nov. 22, 1996, now Pat. No. 5,822,603, which is a division of application No. 08/516,036, filed on Aug. 16, 1995, now Pat. No. 5,742,840.

(60) Provisional application No. 60/317,427, filed on Sep. 4, 2001.

(51) Int. Cl.
G06F 7/00 (2006.01)
G06F 7/52 (2006.01)

(52) U.S. Cl. .................................. 708/492; 708/628
(58) Field of Classification Search .......... 708/491–492
See application file for complete search history.

(56) References Cited

U.S. PATENT DOCUMENTS 4,852,098 A  7/1989 Brechard et al.

(Continued)

FOREIGN PATENT DOCUMENTS

WO    WO 93/11500    6/1993

OTHER PUBLICATIONS

IEEE Draft Standard for "Scalable Coherent Interface-Low-Voltage Differential Signal Specifications and Packet Encoding", IEEE Standards Department, P1596.3/D0.15 (Mar. 1992).

(Continued)

*Primary Examiner*—Tan V Mai
(74) *Attorney, Agent, or Firm*—McDermott Will & Emery LLP

(57) ABSTRACT

The present invention provides a system and method for improving the performance of general-purpose processors by implementing a functional unit that computes the product of a matrix operand with a vector operand, producing a vector result. The functional unit fully utilizes the entire resources of a 128b by 128b multiplier regardless of the operand size, as the number of elements of the matrix and vector operands increase as operand size is reduced. The unit performs both fixed-point and floating-point multiplications and additions with the highest-possible intermediate accuracy with modest resources.

14 Claims, 7 Drawing Sheets

U.S. PATENT DOCUMENTS

| | | | |
|---|---|---|---|
| 4,875,161 | A | 10/1989 | Lahti et al. |
| 4,949,294 | A | 8/1990 | Wambergue et al. |
| 4,953,073 | A | 8/1990 | Moussouris et al. |
| 4,959,779 | A | 9/1990 | Weber et al. |
| 5,081,698 | A | 1/1992 | Kohn |
| 5,113,506 | A | 5/1992 | Moussouris et al. |
| 5,155,816 | A | 10/1992 | Kohn |
| 5,161,247 | A | 11/1992 | Murakami et al. |
| 5,179,651 | A | 1/1993 | Taaffe et al. |
| 5,231,646 | A | 7/1993 | Heath et al. |
| 5,233,690 | A | 8/1993 | Sherlock et al. |
| 5,241,636 | A | 8/1993 | Kohn |
| 5,280,598 | A | 1/1994 | Osaki et al. |
| 5,487,024 | A | 1/1996 | Girardeau, Jr. |
| 5,515,520 | A | 5/1996 | Hatta et al. |
| 5,533,185 | A | 7/1996 | Lentz et al. |
| 5,590,365 | A | 12/1996 | Ide et al. |
| 5,600,814 | A | 2/1997 | Gahan et al. |
| 5,636,351 | A | 6/1997 | Lee |
| 5,721,892 | A | 2/1998 | Peleg et al. |
| 5,734,874 | A | 3/1998 | Van Hook et al. |
| 5,758,176 | A | 5/1998 | Agarwal et al. |
| 5,768,546 | A | 6/1998 | Kwon |
| 5,847,981 | A * | 12/1998 | Kelley et al. ............... 708/603 |
| 5,887,183 | A | 3/1999 | Agarwal et al. |
| 5,996,057 | A | 11/1999 | Scales, III et al. |
| 6,009,450 | A * | 12/1999 | Dworkin et al. ............ 708/492 |
| 6,230,179 | B1 * | 5/2001 | Dworkin et al. ............ 708/492 |
| 6,425,073 | B2 | 7/2002 | Roussel et al. |
| 6,516,406 | B1 | 2/2003 | Peleg et al. |
| 6,643,765 | B1 | 11/2003 | Hansen et al. |
| 6,725,356 | B2 | 4/2004 | Hansen et al. |
| 6,735,611 | B2 * | 5/2004 | Vanstone ..................... 708/492 |
| 2003/0009503 | A1 * | 1/2003 | Glaser et al. ................ 708/625 |

OTHER PUBLICATIONS

IEEE Draft Standard for "High-Bandwidth Memory Interface Based on SCI Signaling Technology (RamLink)," IEEE Standards Department, Draft 1.25 IEEE P11596.4-199X (May 1995).

Gerry Kane et al., "MIPS RISC Architecture," Prentice Hall (1995).

IBM, "The PowerPC Architecture: A Specification For A New Family of RISC Processors," 2nd Ed., Morgan Kaufmann Publishers, Inc., (1994).

Hewlett-Packard Co., "PA-RISC 1.1 Architecture and Instruction Set," Manual Part No. 09740-90039, (1990).

MIPS Computer Systems, Inc., "MIPS R4000 User's Manual," Mfg. Part No. M8-00040, (1990).

i860™ Microprocessor Architecture, Neal Margulis, Foreword by Les Kohn.

Gove, "The MVP: A Highly-Integrated Video Compression Chip," IEEE Data Compression Conference, pp. 215-224 (Mar. 1994).

Gove, "The Multimedia Video Processor (MVP): A Chip Architecture for Advanced DSP Applications," IEEE DSP Workshop, pp. 27-30 (Oct. 2-5, 1994).

Guttag et al., "A Single-Chip Multiprocessor for Multimedia: The MVP," IEEE Computer Graphics & Applications, pp. 53-64 (Nov. 1992).

Lee et al., "MediaStation 5000: Integrating Video and Audio," IEEE Multimedia pp. 50-61 (Summer 1994).

TMS320C80 (MVP) Parallel Processor User's Guide, Texas Instruments (Mar. 1995).

TMS320C80 (MVP) Master Processor User's Guide, Texas Instruments (Mar. 1995).

Bass et al., "The PA 7100LC Microprocessor: A Case Study of IC Design Decisions in a Competitive Environment," Hewlett-Packard Journal, vol. 46, No. 2, pp. 12-22 (Apr. 1995).

Bowers et al., "Development of a Low-Cost, High Performance, Multiuser Business Server System," Hewlett-Packard Journal, vol. 46, No. 2, p. 79 (Apr. 1995).

Gwennap, "New PA-RISC Processor Decodes MPEG Video: Hewlett-Packard's PA-7100LC Uses New Instructions to Eliminate Decoder Chip," Microprocessor Report, pp. 16-17 (Jan. 24, 1994).

Gwennap, "Digital MIPS Add Multimedia Extensions," Microdesign Resources, pp. 24-28 (Nov. 18, 1996).

Kurpanek et al., "PA7200: A PA-RISC Processor with Integrated High Performance MP Bus Interface," IEEE COMPCON '94, pp. 375-382 (Feb. 28-Mar. 4, 1994).

Lee et al., "Pathlength Reduction Features in the PA-RISC Architecture," IEEE COMPCON, pp. 129-135 (Feb. 24-28, 1992).

Lee et al., "Real-Time Software MPEG Video Decoder on Multimedia-Enhanced PA 7100LC Processors," Hewlett-Packard Journal, vol. 46, No. 2, pp. 60-68 (Apr. 1995).

Lee, "Realtime MPEG Video via Software Decompression on a PA-RISC Processor," IEEE, pp. 186-192 (1995).

Martin, "An Integrated Graphics Accelerator for a Low-Cost Multimedia Workstation," Hewlett-Packard Journal, vol. 46, No. 2, pp. 43-50 (Apr. 1995).

Undy et al., "A Low-Cost Graphics and Multimedia Workstation Chip Set," IEEE Micro, pp. 10-22 (Apr. 1994).

HP 9000 Series 700 Workstations Technical Reference Manual: Model 712, Hewlett-Packard (Jan. 1994).

PA-RISC 1.1 Architecture and Instruction Set Reference Manual, Third Edition, Hewlett-Packard (Feb. 1994).

Ang, "StarT Next Generation: Integrating Global Caches and Dataflow Architecture," Proceedings of the ISCA 1992 Dataflow Workshop (1992).

Beckerle, "Overview of the StarT (*T) Multithreaded Computer," IEEE COMPCON '93, pp. 148-156 (Feb. 22-26, 1993).

Diefendorff et al., "The Motorola 88110 Superscalar RISC Multiprocessor," IEEE pp. 157-162 (1992).

Gipper, "Designing Systems for Flexibility, Functionality, and Performance with the 88110 Symmetric Superscalar Microproessor," IEEE (1992).

Nikhil et al., "*T: A Multithreaded Massively Parallel Architecture," Computation Structures Group Memo 325-2, Laboratory for Computer Science, Massachusetts Institute of Technology (Mar. 5, 1992).

Papadopoulos et al., "*T:Integrated Building Blocks for Parallel Computing," ACM, pp. 624-635 (1993).

Patterson, "Motorola Announces First High Performance Single Board Computer Using Superscalar Chip," Motorola Computer Group (Sep. 1992).

M-Philip, "Performance Issues for 88110 RISC Microprocessor," IEEE, 1992.

M. Smotherman et al., "Instruction Scheduling for the Motorola 88110," IEEE, 1993.

R. Mueller, "The MC88110 Instruction Sequencer," Northcon, 1992.

J. Arends, "88110: Memory System and Bus Interface," Northcon, 1992.

K. Pepe, "The MC88110's High Performance Load/Store Unit," Northcon, 1992.

J. Maguire, "MC88110: Datpath," Northcon, 1992.

Abel et al., "Extensions to FORTRAN for Array Processing," ILLIAC IV Document No. 235, Department of Computer Science, University of Illinois at Urbana-Champaign (Sep. 1, 1970).

Barnes et al., "The ILLIAC IV Computer," IEEE Transactions on Computers, vol. C-17, No. 8, pp. 746-757 (Aug. 1968).

Knapp et al., "Bulk Storage Applications in the ILLIAC IV System," ILLIAC IV Document No. 250, Center for Advanced Computation, University of Illinois at Urbana-Champaign (Aug. 3, 1971).

Awaga et al., "The µVP 64-bit Vector Coprocessor: A New Implementation of High-Performance Numerical Computation," IEEE Micro, vol. 13, No. 5, pp. 24-36 (Oct. 1993).

Takahashi et al., "A 289 MFLOPS Single Chip Vector Processing Unit," The Institute of Electronic, Information, and Communication Engineers Technical Research Report, pp. 17-22 (May 28, 1992).

Uchiyama et al., "The Gmicro/500 Superscalar Microprocessor with Branch Buffers," IEEE Micro (Oct. 1993).

Broughton et al., "The S-I Project: Top-End Computer Systems for National Security Applications," (Oct. 24, 1985).

Farmwald et al., "Signal Processing Aspects of the S-I Multiprocessor Project," SPIE vol. 241, Real-Time Signal Processing (1980).

Farmwald, "High Bandwidth Evaluation of Elementary Functions," IEEE Proceedings, 5th Symposium on Computer Arithmetic (1981).
Gilbert, "An Investigation of the Partitioning of Algorithms Across an MIMD Computing System," (Feb. 1980).
Widdoes, "The S-I Project: Developing High-Performance Digital Computers," IEEE Computer Society COMPCON Spring 1980 (Dec. 11, 1979).
Cornell, S-I Uniprocessor Architecture SMA-4.
The S-I Project, Jan. 1985, S-I Technical Staff.
The S-I Architecture and Assembler SMA-4 Manual, Dec. 19, 1979 (Preliminary Version).
Michielse, "Performing the Convex Exemplar Series SPP System," Proceedings of Parallel Scientific Computing, First Intl Workshop, PARA '94, pp. 375-382 (Jun. 20-23, 1994).
Wadleigh et al., "High Performance FFT Algorithms for the Convex C4/XA Supercomputer," Poster, Conference on Supercomputing, Washington, D.C. (Nov. 1994).
C4 Technical Overview (Sep. 23, 1993).
Saturn Assembly Level Performance Tuning Guide (Jan. 1, 1994).
Saturn Difference from C Series (Feb. 6, 1994).
"Convex Adds GaAs System," Electronics News (Jun. 20, 1994).
Convex Architecture Reference Manual, Sixth Edition (1992).
Convex Assembly Language Reference Manual, First Edition (Dec. 1991).
Convex Data Sheet C4-XA Systems, Convex Computer Corporation.
Saturn Overview (Nov. 12, 1993).
Convex Notebook containing various "Machine Descriptions".
"Convex C4-XA Offer 1 GFLOPS from GaAs Uniprocessor," Computergram International, Jun. 15, 1994.
Excerpt from Convex C4600 Assembly Language Manual, 1995.
Excerpt from "Advanced Computer Architectures—A Design Space Approach," Chapter 14.8, "The Convex C4-XA System".
Convex C4600 Assembly Language Manual, First Edition, May 1994.
Alvarez et al., "A 450MHz PowerPC Microprocessor with Enhanced Instruction Set and Copper Interconnect," ISSCC (Feb. 1999).
Tyler et al., "AltiVec™: Bringing Vector Technology to the PowerPC™ Processor Family," IEEE (Feb. 1999).
AltiVec™ Technology Programming Environments Manual (1998).
Atkins, "Performance and the i860 Microprocessor," IEEE Micro, pp. 24-27, 72-78 (Oct. 1991).
Grimes et al., "A New Processor with 3-D Graphics Capabilities," NCGA '89 Conference Proceedings, vol. 1, pp. 275-284 (Apr. 17-20, 1989).
Grimes et al., "The Intel i860 64-Bit Processor: A General-Purpose CPU with 3D Graphics Capabilities," IEEE Computer Graphics & Applications, pp. 85-94 (Jul. 1989).
Kohn et al., "A 1,000,000 Transistor Microprocessor," 1989 IEEE International Solid-State Circuits Conference Digest of Technical Papers, pp. 54-55, 290 (Feb. 15, 1989).
Kohn et al., "A New Micrprocessor with Vector Processing Capabilities," Electro/89 Conference Record, pp. 1-6 (Apr. 11-13, 1989).
Kohn et al., "Introducing the Intel i860 64-Bit Microprocessor," IEEE Micro, pp. 15-30 (Aug. 1989).
Kohn et al., "The i860 64-Bit Supercomputing Microprocessor," AMC, pp. 450-456 (1989).
Margulis, "i860 Microprocessor Architecture," Intel Corporation (1990).
Mittal et al., "MMX Technology Architecture Overview," Intel Technology Journal Q3 '97, pp. 1-12 (1997).
Patel et al., "Architecture Features of the i860—Microprocessor RISC Core and On-Chip Caches," IEEE, pp. 385-390 (1989).
Rhodehamel, "The Bus Interface and Paging Units of the i860 Microprocessor,"IEEE, pp. 380-384 (1989).
Perry, "Intel's Secret is Out," IEEE Spectrum, pp. 22-28 (Apr. 1989).
Sit et al., "An 80 MFLOPS Floating-Point Engine in the Intel i860 Processor," IEEE, pp. 374-379 (1989).
i860 XP Microprocessor Data Book, Intel Corporation (May 1991).
Paragon User's Guide, Intel Corporation (Oct. 1993).
N15 Micro Architecture Specification, dated Apr. 29, 1991.
N15 External Architecture Specification, dated Oct. 17, 1990.
N15 External Architecture Specification, dated Dec. 14, 1990.
N15 Product Requirements Document, date Dec. 21, 1990.

N15 Product Implementation Plan, dated Dec. 21, 1990.
N12 Performance Analysis document version 2.0, dated Sep. 21, 1990.
Hansen, "Architecture of a Broadband Mediaprocessor," IEEE COMPCON 96 (Feb. 25-29, 1996).
Moussouris et al., "Architecture of a Broadband MediaProcessor," Microprocessor Forum (1995).
Arnould et al., "The Design of Nectar: A Network Backplane for Heterogeneous Multicomputers," ACM (1989).
Bell, "Ultracomputers: A Teraflop Before Its Time," Communications of the ACM, (Aug. 1992) pp. 27-47.
Broomell et al., "Classification Categories and Historical Development of Circuit Switching Topologies," Computing Surveys, vol. 15, No. 2, pp. 95-133 (Jun. 1983).
Culler et al., "Analysis of Multithreaded Microprocessors Under Multiprogramming," Report No. UCB/CSD 92/687 (May 1992).
Donovan et al., "Pixel Processing in a Memory Controller," IEEE Computer Graphics and Applications, pp. 51-61 (Jan. 1995).
Fields, "Hunting for Wasted Computing Power: New Software for Computing Networks Puts Idle PC's to Work," Univ. of Wisconsin-Madison, http://www.cs.wisc.edu/condor/doc/WiscIdea.html (1993).
Geist, "Cluster Computing: The Wave of the Future?," Oak Ridge National Laboratory, 84OR21400 (May 30, 1994).
Ghafoor, "Systolic Architecture for Finite Field Exponentiation," IEEE Proceedings, vol. 136 (Nov. 1989).
Giloi, "Parallel Programming Models and their Interdependence with Parallel Architectures," IEEE Proceedings (Sep. 1993).
Hwang et al., "Parallel Processing for Supercomputers and Artificial Intelligence," (1993).
Hwang, "Advanced Computer Architecture: Parallelism, Scalability, Programmability," (1993).
Hwang, "Computer Architecture and Parallel Processing," McGraw Hill (1984).
Iwaki, "Architecture of a High Speed Reed-Solomon Decoder," IEEE Consumer Electronics (Jan. 1994).
Jain et al., "Square-Root, Reciprocal, Sine/Cosine, Arctangent Cell for Signal and Image Processing," IEEE ICASSP '94, pp. 11-521-11-524 (Apr. 1994).
Laudon et al., "Architectural and Implementation Tradeoffs in the Design of Multiple-Context Processors," Technical Report: CSL-TR-92-523 (May 1992).
Lawrie, "Access and Alignment of Data in an Array Processor," IEEE Transactions on Computers, vol. C-24, No. 12, pp. 99-109 (Dec. 1975).
Le-Ngoc, "A Gate-Array-Based Programmable Reed-Solomon Codec: Structure-Implementation-Applications," IEEE Military Communications (1990).
Litzkow et al., "Condor—A Hunter of Idle Workstations," IEEE (1988).
Markstein, "Computation of Elementary Functions on the IBM RISC System/6000 Processor," IBM J. Res. Develop., vol. 34, No. 1, pp. 111-119 (Jan. 1990).
Nienhaus, "A Fast Square Rooter Combining Algorithmic and Table Lookup Techniques," IEEE Proceedings Southeastcon, pp. 1103-1105 (1989).
Renwick, "Building a Practical HIPPI LAN," IEEE, pp. 355-360 (1992).
Rohrbacher et al., "Image Processing with the Staran Parallel Computer," IEEE Computer, vol. 10, No. 8, pp. 54-59 (Aug. 1977) (reprinted version pp. 119-124).
Ryne, "Advanced Computers and Simulation," IEEE, pp. 3229-3333 (1993).
Siegel, "Interconnection Networks for SIMD Machines," IEEE Computer, vol. 12, No. 6 (Jun. 1979) (reprinted version pp. 110-118).
Singh et al., "A Programmable HIPPI Interface for a Graphics Supercomputer," ACM (1993).
Smith, "Cache Memories," Computing Surveys, vol. 14, No. 3 (Sep. 1982).
Tenbrink et al., "HIPPI: The First Standard for High-Performance Networking," Los Alamos Science (1994).
Tolmie, "Gigabit LAN Issues: HIPPI, Fibre Channel, or ATM," Los Alamos National Laboratory Report No. LA-UR 94-3994 (1994).

Tolmie, "HIPPI: It's Not Just for Supercomputers Anymore," Data Communications (May 8, 1995).

Toyokura et al., "A Video DSP with a Macroblock-Level-Pipeline and a SIMD type Vector-Pipelined Architecture for MPEG2 CODEC," ISSCC94, Section 4, Video and Communications Signal Processors, Paper WP 4.5, pp. 74-75 (1994).

Tullsen et al., "Simultaneous Multithreading: Maximizing On-Chip Parallelism," Proceedings of the 22nd Annual International Symposium on Computer Architecture (Jun. 1995).

Turcotte, "A Survey of Software Environments for Exploiting Networked Computing Resources," Engineering Research Center for Computational Field Simulation (Jun. 11, 1993).

Vetter et al., "Network Supercomputing: Connecting Cray Supercomputers with a HIPPI Network Provides Impressively High Execution Rates," IEEE Network (May 1992).

Wang, "Bit-Level Systolic Array for Fast Exponentiation in GF(2m)," IEEE Transactions on Computers, vol. 43, No. 7, pp. 838-841 (Jul. 1994).

Ware et al., "64 Bit Monolithic Floating Point Processors," IEEE Journal of Solid-State Circuits, vol. Sc-17, No. 5 (Oct. 1982).

"Bit Manipulator," IBM Technical Disclosure Bulletin, pp. 1575-1576 (Nov. 1974).

Finney et al., "Using a Common Barrel Shifter for Operand Normalization, Operand Alignment and Operand Unpack and Pack in Floating Point," IBM Technical Disclosure Bulletin, pp. 699-701 (Jul. 1986).

Data General A ViiON A V500, 4500 and 5500 Servers.

Jovanovic et al., "Computational Science: Advances Through Collaboration," San Diego Supercomputer Center Science Report (1993).

High Performance Computing and Communications: Toward a National Information Infrastructure, National Science Foundation (NSF) (1994).

National Coordination Office for High Performance Computing and Communications, "High Performance Computing and Communications: Foundation for America's Information Future" (1996).

Wilson, "The History of the Development of Parallel Computing," http://ei.cs.vt.edu/~history/Parallel.html.

Original Complaint for Patent Infringement, *MicroUnity Systems Engineering, Inc. v. Dell, Inc. f/k/a/ Dell Computer and Intel Corporation*, C.A. No. 2-04CV-120; In the United States District Court of the Eastern District of Texas, Marshall Division filed Mar. 26, 2004.

Amended Complaint for Patent Infringement, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Apr. 20, 2004.

Expert Witness Report of Richard A. Killworth, Esq., *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 12, 2005.

Declaration and Expert Witness Report of Ray Mercer Regarding Written Description and Enablement Issues, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 12, 2005.

Corrected Expert Report of Dr. Stephen B. Wicker Regarding Invalidity of U.S. Patent Nos. 5,742,840; 5,794,060; 5,764,061; 5,809,321; 6,584,482; 6,643,765; 6,725,356 and Exhibits A-1; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Oct. 6, 2005.

Defendants Intel and Dell's Invalidity Contentions with Exhibits A-G; *MicroUnity Systems Engineering, Inc. v. Dell, Inc. f/k/a/ Dell Computer and Intel Corporation*; C.A. No. 2-04CV-120; In the United States District Court of the Eastern District of Texas; Marshall District filed Sep. 19, 2005.

Defendants Dell Inc. and Intel Corporation's Identification of Prior Art Pursuant to 35 USC §252; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Oct. 7, 2005.

Request for *Inter Partes* Reexamination Under ISC §§ 311-318 of U.S. Patent No. 6,725,356 filed Jun. 28, 2005.

Deposition of Larry Mennemeier on Sep. 22, 2005 and Exhibit 501; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division.

Deposition of Leslie Kohn on Sep. 22, 2005; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division.

Intel Article, "*Intel Announces Record Revenue of 9.96 Billion*", Oct. 18, 2005.

The New York Times Article, "*Intel Posts 5% Profit Increase on Demand for Notebook Chips*", Oct. 19, 2005.

USA Today Article, "*Intel's Revenue Grew 18% In Robust Quarter for Tech*", Oct. 19, 2005.

The Wall Street Journal Article, "*Intel Says Chip Demand May Slow*", Oct. 19, 2005.

The New York Times Article, "*Intel Settlement Revives A Fading Chip Designer*", Oct. 20, 2005.

Markoff, John, "Intel Settlement Revives a Fading Chip Designer," The New York Times (Oct. 20, 2005).

Intel Press Release, "Intel Announces Record Revenue of $9.96 Billion," Santa Clara, CA, Oct. 18, 2005.

* cited by examiner

FIG. 7

SYSTEM AND METHOD TO IMPLEMENT A MATRIX MULTIPLY UNIT OF A BROADBAND PROCESSOR

RELATED APPLICATIONS

This application claims the benefit of priority to U.S. Provisional Application No. 60/317,427, filed Sep. 4, 2001, and is a continuation in part of U.S. patent application Ser. No. 09/922,319, filed Aug. 2, 2001, now U.S. Pat. No. 6,725,356, which is a continuation of U.S. patent application Ser. No. 09/382,402, filed Aug. 24, 1999, now U.S. Pat. No. 6,295,599, which is a continuation in part of U.S. patent application Ser. No. 09/169,963, filed Oct. 13, 1998, now U.S. Pat. No. 6,006,318, which is a continuation of U.S. patent application Ser. No. 08/754,827, filed Nov. 22, 1996, now U.S. Pat. No. 5,822,603, which is a divisional of U.S. patent application Ser. No. 08/516,036, filed Aug. 16, 1995, now U.S. Pat. No. 5,742,840.

FIELD OF THE INVENTION

The present invention relates to matrix multiply units. More particularly, the invention relates to a system and method to implement a matrix multiply unit of a broadband processor.

BACKGROUND OF THE INVENTION

Recent multimedia CPUs operate in parallel on 128b vectors, partitioned into 8-16 b elements. Exemplars of these designs are described in Craig Hansen. *Micro Unity's Media Processor Architecture*. IEEE Micro, 16(4):34-41, August 1996, and Keith Diefendorff. *Pentium III=Pentium II+SSE*. Microprocessor Report, 13(3):1,6-11, March 1999. These designs perform arithmetic operations on values partitioned into vectors, such as addition and multiplication. The operations are performed by functional units in which the hardware employed to perform the operation, an adder for an add operation, or a multiplier for a multiply operation is in turn partitioned so as to perform vector operations of the specified element size. Vector adds need only AND carries between elements, but vector multiplies idle all but a single stripe one element wide through the product array. Thus, a 128b×128b multiplier, when performing a vector multiplication on 8 b operands, only employs the resources of an 8 b×128b multiplier, leaving resources of the size of a 120 b×128b multiplier idle, or performing a mathematically trivial operation, such as multiplication by zero.

As the hardware resources for a multiplier capable of performing a 128b×128b are considerably larger than that of a 128b+128b adder, the lower utilization of the multiplier when performing vector multiplications of a smaller element size is of considerable concern in designing an efficient processor. While one approach to designing an efficient multiplier is to limit the size of the multiplier to a smaller strip which can perform vector multiplications only of small elements in a single pipeline flow, the present invention instead aims to make efficient use of a large 128b×128b multiplier array pipeline by performing a vector-matrix product.

SUMMARY OF THE INVENTION

A vector-matrix multiplier unit fully utilizes a 128×128b data path for operand sizes from 8 to 128b and operand types including signed, unsigned or complex, and fixed-, floating-point, polynomial, or Galois-field while maintaining full internal precision.

The present invention may include a method of performing multiplication with integrated polynomial multiplication capability comprising the steps of: receiving the multiplier operand, the multiplicand operand, and the polynomial specification signal; calculating a product, the product being one of an integer product or a polynomial product, depending on the polynomial specification signal; and transmitting the result.

In accordance with a method of the present invention, the step of calculating the product may include producing partial products and calculating one of an integer product or polynomial product based on the partial products, and wherein the step of producing the partial product may modify a calculation of x1, x2 and negate selection signals using an enhanced Booth encoder, depending on the polynomial specification signal.

The method of the present invention may further comprise the steps of calculating x1, x2 and negate selection signals and recoding the x1, x2 and negate selection signals into x1 pass, x1force, x2pass, x2force signals; combining x1pass, x1force, x2pass, x2force signals with multiplicand x1 and multiplicand x2 signals producing a partial product; and inhibiting the value of the x1force, x2pass and x2force signals at certain multiplexor locations to produce an alternate partial product.

The method of the present invention, wherein the step of calculating the product may include producing partial products, and may further include the step of adding partial products in a partial products summation tree, in which the carry output of each full adder is inhibited to perform polynomial multiplication, depending on the polynomial specification signal.

The present invention may further include a method of performing matrix multiplication with partitioning capability comprising the steps of: receiving a multiplier operand, a multiplicand operand, and a partitioning specification signal; calculating partitioned product, depending on a partitioning specification signal; and transmitting the calculated partitioned product.

The method of the present invention, wherein the step of calculating a partitioned product may further comprise the step of producing a carry-save result with no additions for the least significant four bits of an 8 b partial product In accordance with the method of the present invention, the step of calculating a partitioned product may further comprise the step of obtaining a partial product computation in which separate head and tail bits are produced at a partition boundary between operands, or fused together into a single 8 b partial product.

The present invention may comprise a system of performing multiplication with integrated polynomial multiplication capability comprising: a receiver which receive a multiplier operand, a multiplicand operand, and a polynomial specification signal; a multiplier that calculates an integer product or polynomial product, depending on a polynomial specification signal; and a transmitter that transmits one of the integer product or the polynomial product calculated by the calculator.

In the system of the present invention, the multiplier may include a portion which produces partial products and a portion which calculates one of an integer product or polynomial product based on the partial products, and wherein the portion that produces partial products may include an enhanced Booth encoder that modifies a calculation of x1, x2 and negate selection signals, depending on the polynomial specification signal.

The present invention may further include a system of performing matrix multiplication with partitioning capability comprising: a receiver which receives a multiplier operand, a multiplicand operand, and a partitioning specification signal; a multiplier that computes partitioned product results, depending on a partitioning specification signal; and a transmitter which transmits the partitioned product results computed by the multiplier.

BRIEF DESCRIPTION OF THE DRAWINGS

The accompanying drawings, which are incorporated in and form a part of the specification, serve to explain exemplary principles of the invention. In the drawings:

FIG. 7 illustrates enhanced Booth multiplexor logic function, in accordance with the present invention.

DETAILED DESCRIPTION OF THE INVENTION

Figure 1:
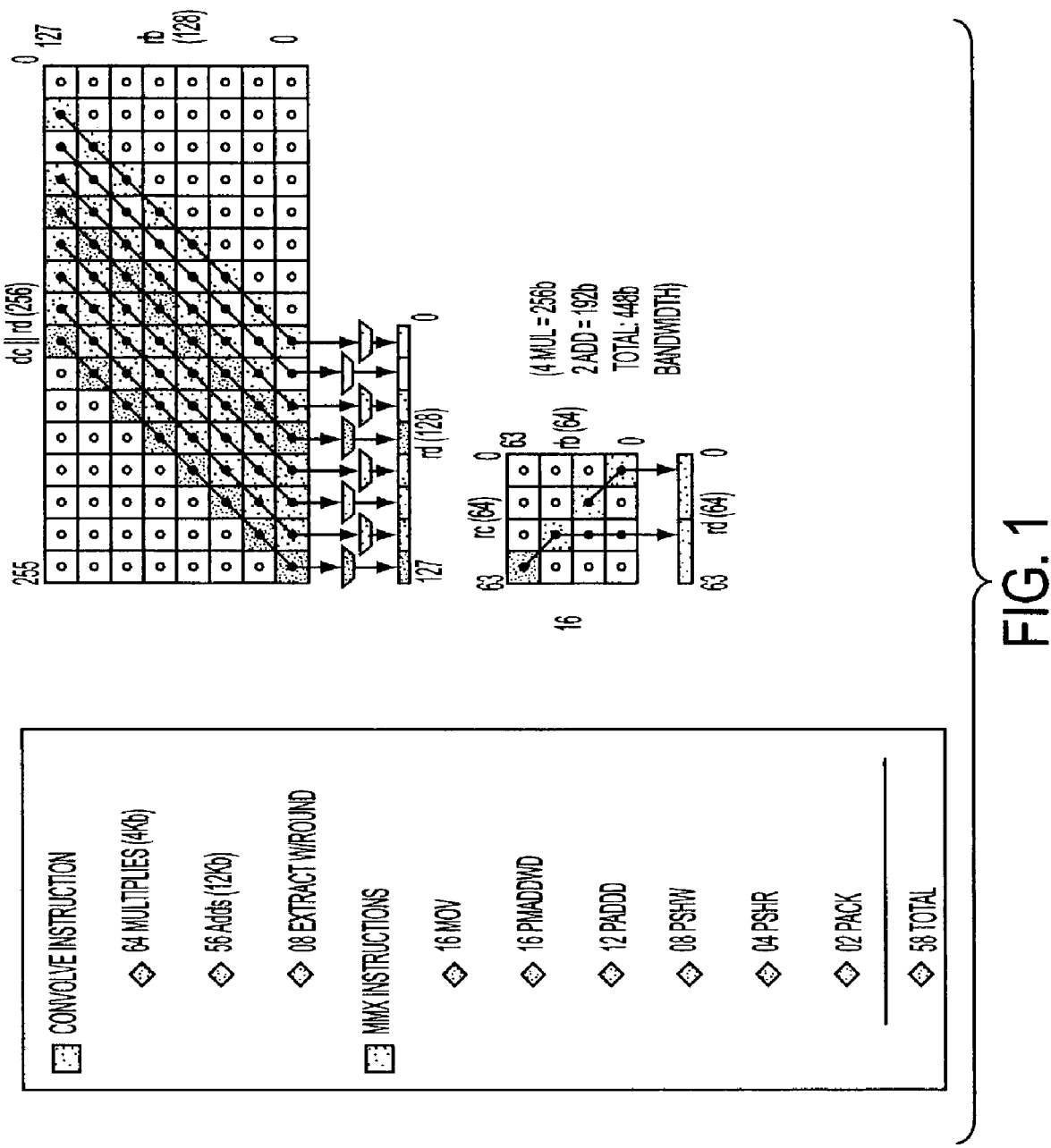
FIG. 1 illustrates a convolve operation in accordance with the present invention versus prior art.

The exemplary implementation is intended to integrate the greatest possible range of function into a generalized multiplier. The first goal was to handle all of the following operand formats:

8 b, 16 b, 32 b, 64 b, 128b integer (un)signed multiplier×(un)signed multiplicand

| 8b, 16b, 32b, 64b, | complex integer |
| 16b, 32b, 64b, 128b | floating-point |
| 16b, 32b, 64b | complex floating-point |
| 8b, 16b, 32b, 64b, 128b | polynomial |
| 8b | Galois-field. |

The second goal was to provide all functions on these data types within reach of a generalized 128×128b multiplier, including:

| wmulmat | (wide) matrix multiply |
| econ | convolve |
| emuladd | multiply add (two vectors element-wise, add to third) |
| emulsum | multiply sum (dot product) |
| emul | multiply (two vectors element-wise) |
| escaladd | scale add (linear combination of two vectors) |

In a 128b×128b vector-matrix product, one operand is a 128b vector, consisting of 128b/size elements of the specified size, and the other operand is a matrix of 128b/size by 128b/size elements. The vector-matrix product is formed by summing the products of the vector operand with 128/size vector "slices" of the matrix operand, producing a 128b vector result. As a product generally has a representation that is twice the size of equal-sized operands, and the representation of a addition has one more bit than the size of equal-sized operands, the sum of the products is larger than the operands, and the representation of the result is compressed by extracting a subset of the bits of the result, and rounding the subset to reflect less-significant bits removed from the result.

The summation of products and partial products in vector-matrix multiplication uses a technique called carry-save addition, in which these products are represented in a form that uses greater than the minimum representable bits, so that carries do not need to propagate from one end of the operand to the other in an addition operation. Commonly, the representation doubles the number of bits, so that carries need not propagate at all, but are saved for a later stage. Thus, an adder that sums two such redundant values receives four bits and produces two bits per non-redundant bit position and is named a 4:2 adder. Other common forms of carry-save adders are 3:2 adders (full adders), which have well-known hardware representation, and are building blocks for 4:2 and 5:2 adders.

Media and signal-processing applications perform conventional arithmetic processing, but may also involve dealing with error-correction, in which rounded results do not have appropriate numerical properties, but an alternate arithmetic forms, known as polynomial, finite-field, and Galois-field arithmetic do. A fundamental component of these alternate forms are polynomial arithmetic, which is much like conventional unsigned arithmetic processing except that all carries are suppressed. It is a goal of the present invention to perform polynomial multiplication as well as conventional multiplication using an integrated design. The present invention combines these two capabilities together to reduce the amount of hardware that would otherwise be required to provide these capabilities in separate hardware.

Floating-point formats combine sign, exponent and significand information into a single operand, producing a representation that greatly expands the range of values that the operand can signify. The representation of a result need not be larger than that of the operands, as the exponent allows for a large range, and the significand can be normalized and rounded, so as to produce the closest representable value to the ideal result. The present invention, because the vector-matrix product sums several scalar products together before scaling and rounding the result, can produce results that are more precise than prior art designs.

Matrices are too wide to fit into a register operand—e.g. 8b matrix has 16×16=256 elements, equivalent to 16 128b registers. An SRAM array of eight 2048b entries is embedded in the multiplier to hold the most recently used matrices. The mechanisms employed in the present invention for providing the wide operand are described in U.S. Pat. No. 6,295,599, "System and method for providing a wide operand architecture." The mechanisms for addressing and filling this embedded matrix cache are identical to the ones used for switch and table caches in the companion Crossbar and Table Lookup units, so much of the infrastructure can be shared. DSP and multimedia code often multiplies one or two matrices many times by a long sequence of vectors. Examples include 4×4 floating-point graphical transform, discrete cosine transform, Reed-Solomon error correction, and AES (Rijndael) encryption.

Fortunately, matrices that change rapidly are often redundant enough to be specified by few registers. For example, the convolve operation is multiplication by a matrix that can be constructed by the Multiplicand Multiplexor from two register operations, as explained below. The Multiplicand Multiplexor also assists the vector operations emuladd, emulsum, escaladd above by forming matrices with one or two non-zero stripes.

The third goal was to perform internal calculations without loss of data—that is, as if intermediate values were computed with unlimited precision. For integer operations, this means that products are computed with double the initial operand width and careful sign extension, and that sums of products keep track of sign and overflow bits that increase in each adder stage.

For floating point operations, one approach would be to convert to integer and then follow the integer discipline, but hardware cost is prohibitive. A more sophisticated strategy is to design each stage of the shift/add tree to forward exactly the results needed to the next stage, but defer the transistor cost of full width to the latest possible stage, as is described in below.

Integrated matrix operations and fully precise processing are a surprisingly compatible and economic mix. The internal accumulations have latency that is independent of width, since they are done in redundant form, and the full width in the last stage is amortized over many fused operations. Using a simple full-width integer verification model as the gold standard of correctness eases logic testing of the hardware.

The fourth goal was to support the full range of mathematical techniques for optimizing accuracy of conversion to each of the above (limited precision) operand formats. These include rounding, saturation, scaling, field extraction, conversions, overflow and other exceptions, NANs, denormalized numbers, etc. These refinements simplify the development of software that complies with standards for algorithms such as MPEG-4 and broadband modems.

FIG. 1 shows the benefit of harnessing an entire 128×128b array as a 16b integer convolve instruction, useful for filtering and correlation. A vector of 8 16b coefficients multiplies an 8×8 matrix constructed by sliding a window one element at a time through 256b of data samples. A total of 58 MMX instructions perform a similar convolve, with loss of data through overflow.

Figure 2:
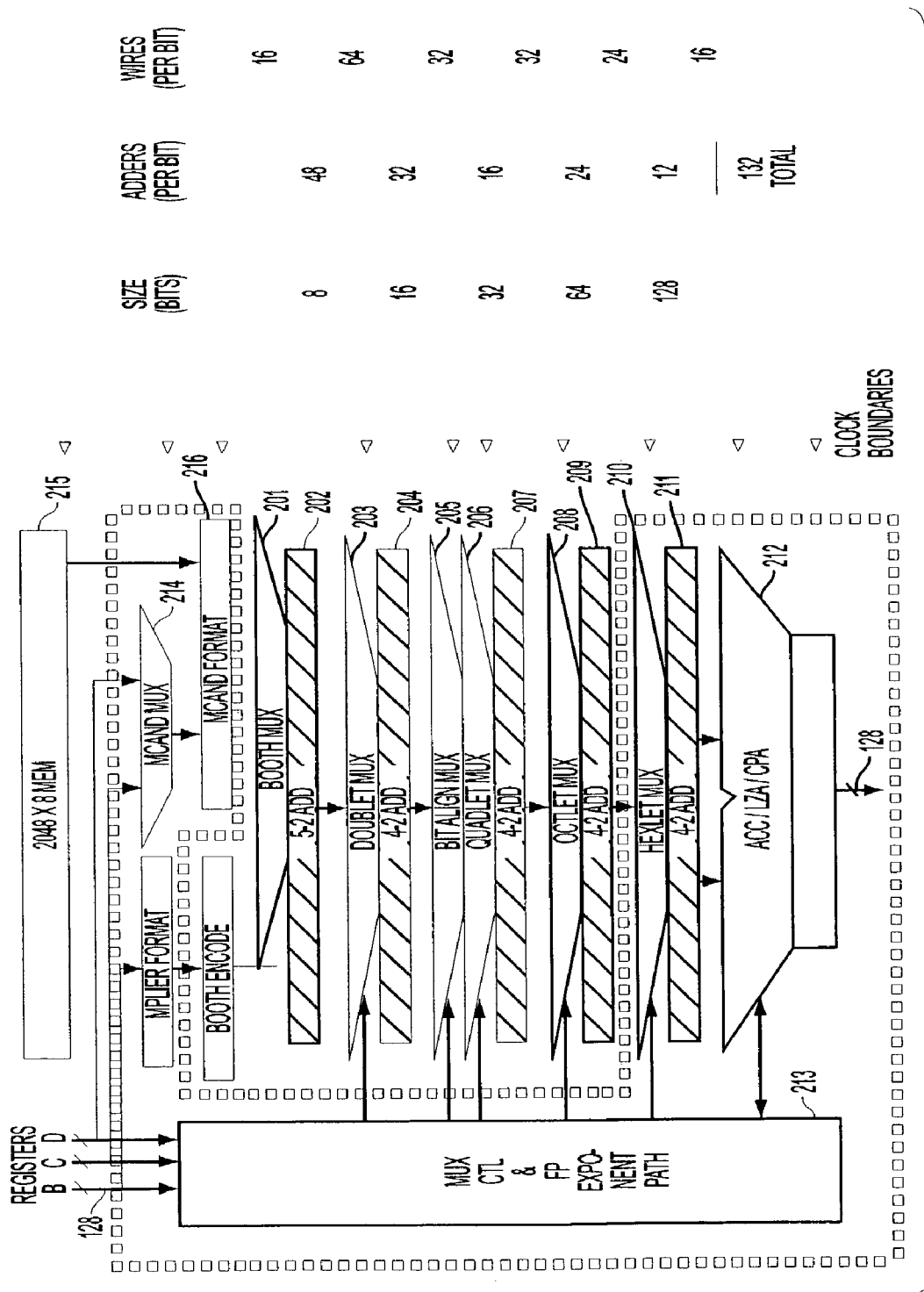
FIG. 2 illustrates a vector-matrix multiplier block diagram, in accordance with the present invention.

FIG. 2 is a block diagram of the proposed vector-matrix multiplier. This design performs on many mathematical types: 128, 64, 32, 16, 8b signed and unsigned integers and polynomials, Galois fields, 128, 64, 32 b IEEE-754 standard [ANSI/IEEE Std 754-1985 Binary Floating-Point Arithmetic, IEEE, 1985] (and an IEEE-754-like 16b) floating-point—with rounding, saturation, complex numbers, exceptions, denormalized numbers, NANs, etc. The unit also computes sums of products without loss of precision.

At the top of FIG. 2 is a memory for eight entries of 16×128b=2048b, which acts as an matrix multiplicand cache e.g. for DCT, graphical transforms, Rijndael or Reed-Solomon syndromes. A matrix operand may also be dynamically constructed from two 128b register operands. The multiplier vector is supplied by a third 128b register operand. Formatters mask exponents and insert hidden bits to convert floating point to integer.

16 parallel ByteMul blocks 201/202 multiply 8b Booth-encoded multipliers with 128b multiplicand vectors and produce 128b partitioned carry-save product strips. These strips are then combined in a 4-stage binary tree of alignment multiplexors 203, 205, 206, 208, 210 and 4:2 adders 204, 207, 209, 211 to reach the full 128b sum of products.

The Doublet Multiplexor 203 aligns byte product strips that are then added into doublet strips comprising 16b partial products. Each floating-point format contains enough exponent bits to allow left shifting significand products up to 7b without overflow, aligning to 8b granularity with the BitAlign Multiplexor 205. Later multiplexors 206, 208, 210, are therefore 8b-granular and require no more than 8 inputs. The Quadlet Multiplexor 206 aligns all strips to 32b boundaries, so no further horizontal shifting of products occur, except for a small fraction of signals that shift by 32, 64b at the 64b or 128b stages. This reduces the number of multiplexor inputs required in the next stage, the Octlet Multiplexor 208. The Octlet multiplexor 208 aligns all strips to 64b boundaries, reducing the number of multiplexor inputs required in the final summation stage, the Hexlet Multiplexor 210. The result of the final 4:2 addition 211 is then accumulated, the leading zero location is anticipated, and a final carry-propagation addition and rounding is performed by block 212. The Multiplexor Control and FP exponent path 213 computes control signals for the Multiplexors, dependent on the values of floating-point exponents, where present, and the specified size of the operands.

The Multiplicand Format block 216 selects either a wide operand from the Wide Operand Memory 215, or a Multiplicand constructed by (possibly redundant) selections from the Multiplicand Mux 214. The Multiplicand Format block 216 produces multiplicands for each ByteMul block 201/202, with circuits located as closely as possible to the ByteMul blocks to minimize the total amount of wiring.

Figure 3:
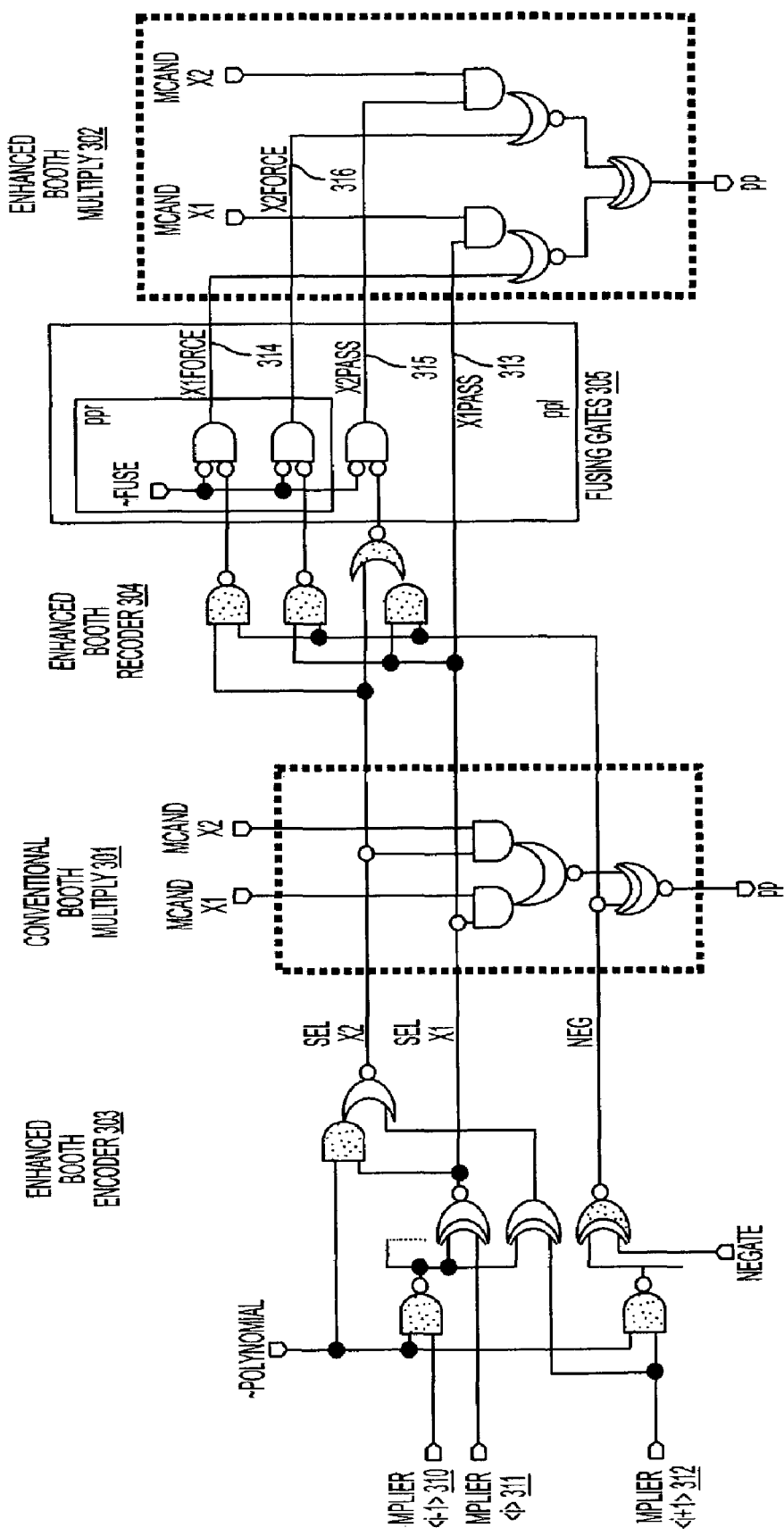
FIG. 3 illustrates enhanced Booth encoder and multiplexor circuits in accordance with the present invention.

FIG. 3 shows the detail of enhanced Booth encode and multiply circuits. The prior art conventional Booth Multiply 301 in the center selects ±2, ±1, 0 multiplicand using signals encoded from a 3b window of the multiplier. The 3b window is shown in FIG. 3 as mplier <I−1>310, mplier <I>311, and mplier <I+1>312. Polynomial and Galois multiplications require the generation of the XOR of the multiplicand x1 and the multiplicand x2 when two adjacent multiplier bits are set, which is a result that the conventional Booth Multiplier in prior art cannot generate. The enhanced Booth Multiply 302 shown on the right has the same multiplicand delay as conventional, but permits a sixth result: the XOR of two neighboring bits for polynomial and Galois multiplies. The enhanced Booth Encoder 303 performs a normal Booth encoding step, selecting the multiplicand x1, or the multiplicand x2, and negate selections according to normal Booth encoding rules, but when the polynomial signal is active, modifies these results to select multiplicand x1 and mutiplicand x2 from multiplier bits <I> and <I+1>, in conjunction with the recoder block 304. The control signals for the enhanced Booth Encoder are designated x1 pass 313, x1force 314, x2pass 315, and x2force 316. The x1pass and x1force signals cause the multiplicand x1 signal to be modified to the fixed values 0 or 1, and the x2pass and x2force signals cause the multiplicand x2 signal to be modified to the fixed values 0 or 1. The combination of these modified values with an XOR gate provides the partial product result. The delay of the shaded gates added to enable polynomial and complex (negated) products balances the multiplier path with multiplicand delay. Fusing gates 305 inhibit a subset of the booth multiply selection controls for bits at or near the boundary between two multiplicand operands, to compute two distinct partial product values at this boundary.

Figure 4:
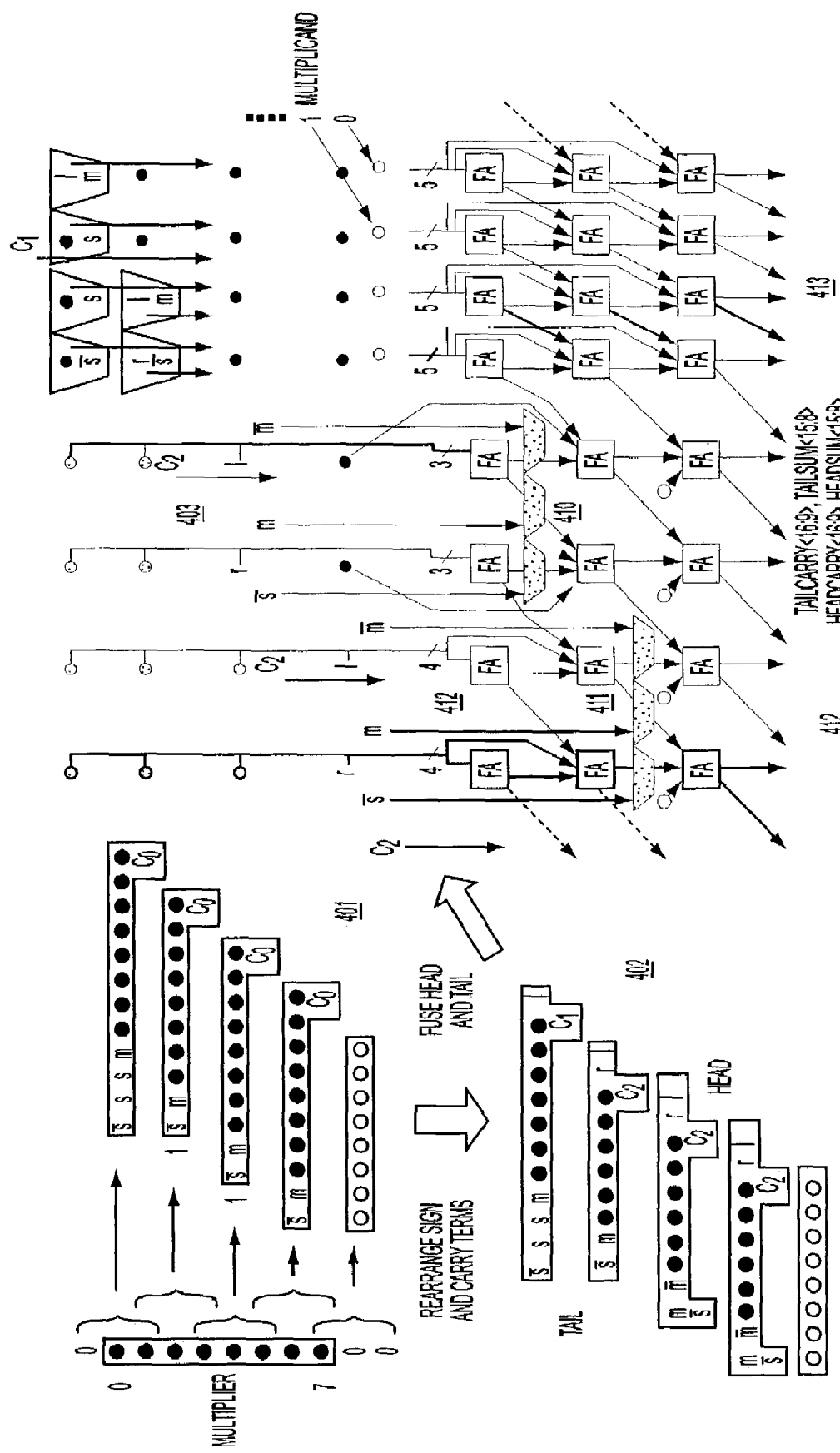
FIG. 4 illustrates a partitionable byte multiplier, in accordance with the present invention.

In FIG. 4, prior art conventional product bits 401 required for an 8×8 signed/unsigned Booth multiplier are shown. Normal partial product bits pp are shown as dots, and special values required at the most significant end of the product are shown as m, s or ~s. Carry input bits c0 are shown for partial product values which have been negated by the Booth encoding. The hollow dot values designate a simple partial product value required for computing the unsigned product in that the 3b field has two zero bits appended, so that only the multiplicand x1 or zero need to be selected. The partial product values are summed in a carry-save adder by summing bits in vertical columns.

The present design product bits 402 rearranges carry-input bits for negated partial products (pp) to produce the lower 4b of carry-save results with no addition, and rearranges sign-extension bits to partition the multiplier at byte boundaries. Special partial product values PPR and PPL are computed at the locations designated r and l in the product bits 402. The lower half of the partial product bits are shaded and designated as head partial product bits, the upper half of the partial product bits are designated as tail partial product bits.

The present design product bits 403 are further rearranged into rectangular layout with the byte boundary partitioned along the diagonal by 2:1 multiplexors 410 and 411. Here the head partial product bits of one operand are shown adjacent to the tail partial product bits of an adjacent operand. Depending on whether these operands are to be fused together, either a single fused result is generated, or separate head and tail results are generated, using the 2:1 multiplexors 410 and 411. The partial products are summed using full adders designated FA for the head bits 412 and tail bits 413.

Figure 5:
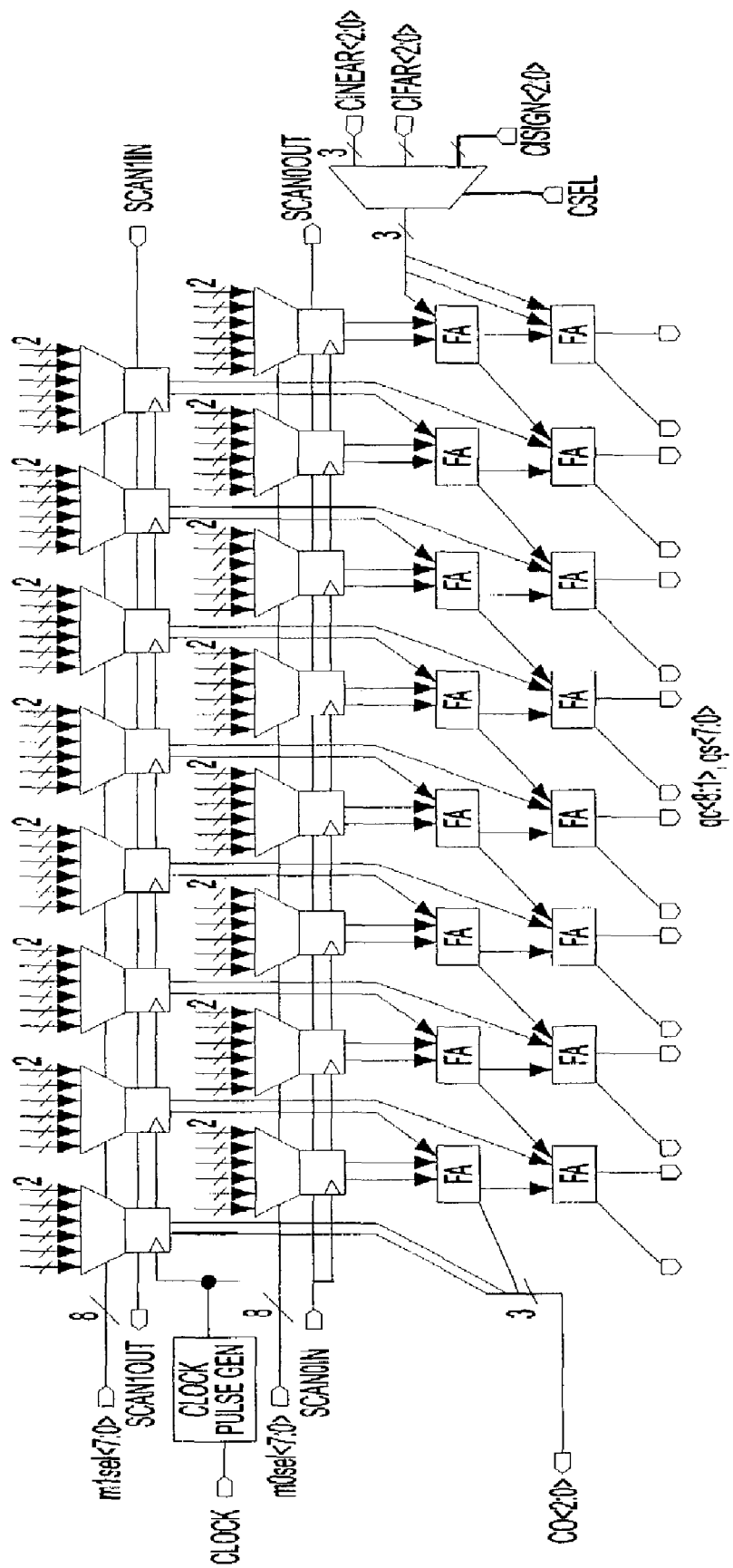
FIG. 5 illustrates an align-reduce block, in accordance with the present invention.

In order to compute polynomial or Galois products, the full adders in FIGS. 4 and 5 perform either the normal 3:2 carry-save addition, or by assertion of a ~polynomial signal, not otherwise shown in the diagram, inhibit the carry signal altogether. The inhibition of the carry signal cause the summation of the partial products to proceed in the fashion required for a polynomial multiplication. It can be noted that certain of the full adders, including all those in FIG. 5, have at least one input which comes from the carry output of another full adder, or an input that comes from a partial product which will be known to have zero value during polynomial multiplication. Such full adders can inhibit carry propagation only from the inputs which are may be non-zero during polynomial multiplication, saving a small amount of power and area of the logic.

Fusing Gates 305 in the PPL and PPR boxes in FIG. 3 modify the control of just the two lower pp generators to absorb the XORs of carry ripple. The 8b ByteMul unit repeats in a 16×17 array.

FIG. 5 shows a representative byte-granular adder stage, combining a clocked multiplexor to select and align operands, a byte-wide 4-2 compressor, or carry-save adder, and a carry-input multiplexor to handle the variety of carry connections. This block repeats in two successive adder stages, producing a dense 16×18 array. It can be appreciated that the clocked multiplexor, because it is clocked, limits the transfer of data at clock boundaries in order to perform matrix multiplications in a pipelined fashion; many matrix multiplications may be calculated at once. The clocked nature also serves to limit the propagation of signals so as to reduce power consumption. However, the location of the clocking can be adjusted numerous ways without changing the nature of the design, such as by using unclocked multiplexors, or even by using clocked 4-2 compressors. This block comprises the data path components of the Doublet, Quadlet, Octlet and Hexlet mux/adder stages 203-204, 206-211.

The number of full adders listed in the first three stages of FIG. 2 is equal to that needed for integer operations. When two floating-point products are added together, the product with a lesser exponent is "sign extended" with bytes that have the sum and carry bits set to one and zero respectively, and added to the product with the greater exponent. Bytes of the lesser-exponent product are passed to the next stage without addition, as the matching bytes of the other product are zero.

A key feature of the reduction (addition) stages is that the products are aligned with respect to a common reference point, so that values that need to be added are therefore equally aligned. This reduces the complexity of forming a sum of floating-point products considerably, as the partial products can be independently aligned. Prior art multiply-add units aligned the addend to the product, but this method would create great complexity in computing the sum of two, four, or eight products as in the present invention.

Further, the reduction stages progressively align the products and partial products as the values propagate through the reduction, which reduces the number of inputs on the multiplexors required to align the operands. The present invention first aligns 16b partial products to 8b alignment, where 8b alignment signifies that the shifting is by zero to seven bits, so that further alignment shifting will be by multiplies of eight bits. This initial alignment takes advantage of excess precision available in the 16b partial product representation to avoid the need to extend the partial product size, made available by the observation that floating-point formats, by devoting a portion of the representation to sign and exponent, leave sufficient zero space in the multiplier and multiplicand to assure seven bits of zeroes in the 16b partial product. Further alignments to 32b alignment preceed the accumulation of 32b partial products, and 64b preceeds the 64b partial product accumulation, and 128b preceeds the 128b partial product accumulation. Overaligning products increases the effective size of the partial results, while underaligning products increases the number of multiplexor inputs at a reduction stage. Thus, the amount of alignment is selected to minimize the amount of hardware.

When two floating-point products are added with exponents that are far enough apart that the products do not overlap or meet at a byte boundary, a pair of carry-save results are generated, with the implicit assumption that intervening bytes will consist of "sign extension" bytes that have the sum and carry bits set to one and zero respectively. In this way, the number of bits needed to represent the sum of two floating-point products is no greater than that of the products themselves.

When four floating-point products are added, however, the sign-extended least product may need to be added to all three greater products. To preserve accuracy in 64b and 128b stages, the number of full adders per bit is triple the integer amount—24 and 12 instead of 8 and 4. For 16b floating-point matrix multiplication, the 64b and 128b reduce stages actually sums eight 16b products without loss, because the 96b width provides overflow margin for the 88b full integer width of these products. Thus, in the latter stages, the 16b floating-point products are converted to fixed-point by aligning the results by the exponent sum.

The Byte Multiplier strip is key to the partitioning of the vector-matrix array. The design evolved through a few stages. A prior art approach was to compute an array of byte products, and then combine them in a doubling tree. At each stage three of the four products overlap, so a 6:2 redundant adder is needed.

For this reason we designed the Byte multiply stage to compute "strips" of products. For example, if the multiplicands are 16 b each, the fuse multiplexors in FIG. 4 will alternately partition and fuse successive bytes. The Doublet Multiplexor in FIG. 2 assembles 24b strips of 8×16b sub-products by selecting the "head" byte at the lsb end and "tail" bytes at the two other byte positions. The multiplexor also handles sign extension. The 32b product is then computed in Doubadd with a 4:2 redundant adder. Similarly, n bit multiplicands result in n strips of n+8 bits (plus sign extension), each shifted 8b relative to the last and combined in a 4:2 binary tree that has the same depth as a conventional non-partitioned multiplier.

Each 8 b unit in the Byte Multiplier strip really does a byte multiply add in the time of a multiply, by using slack at inputs in tail summation to add in the early head bits of the next byte. This extra work eliminates the need for a 6:2 adder at the next stage.

Figure 6:
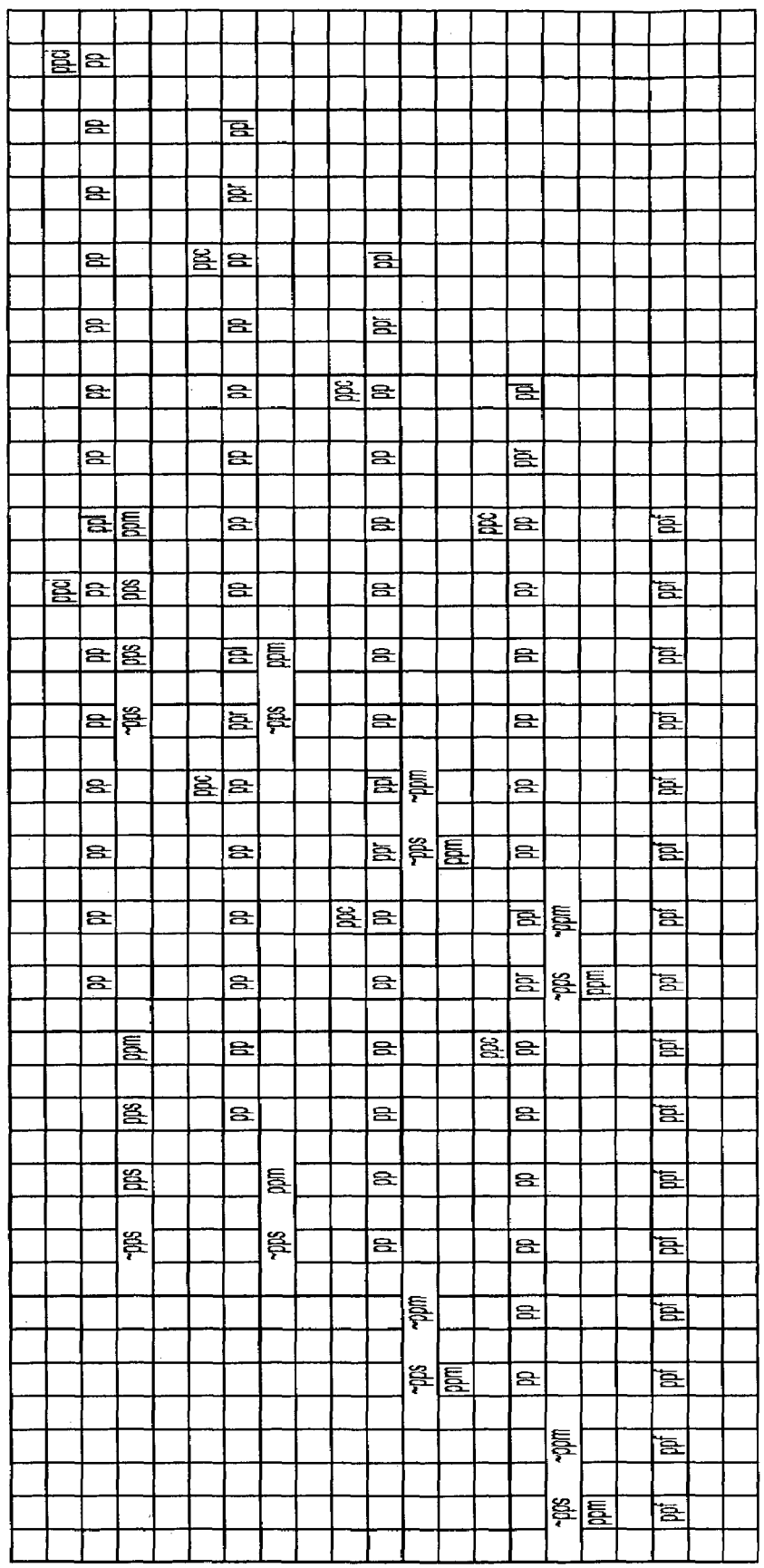
FIG. 6 illustrates details of a byte multiplier partition boundary, in accordance with the present invention.

FIG. 6 shows in more detail the partition boundary between two Booth byte units that is sketched in FIG. 4. FIG. 6 illustrates the arrangement of partial product bits for two adjacent bytes. Where more than one bit is shown, the one bit or two bits are produced for the head partial product, and the other bit or two bits are produced for the tail partial product; when the partial products are fused, a single pp bit is computed as the partial product. The rearrangement in sign and carry positions has the effect of perfectly matching the resources of a 5:2 adder array; in that 5 partial products are produced when a single fused result is needed, and when two results are required, the 5:2 adder array can be partitioned as shown in FIG. 4 so as to produce both the head and tail results. When the operands are all the same size and the size is $2^n$-bytes, the fuse bits at $2^n$-byte element boundaries are identical, so the entire set is just a 4b thermometer code.

Figure 7:
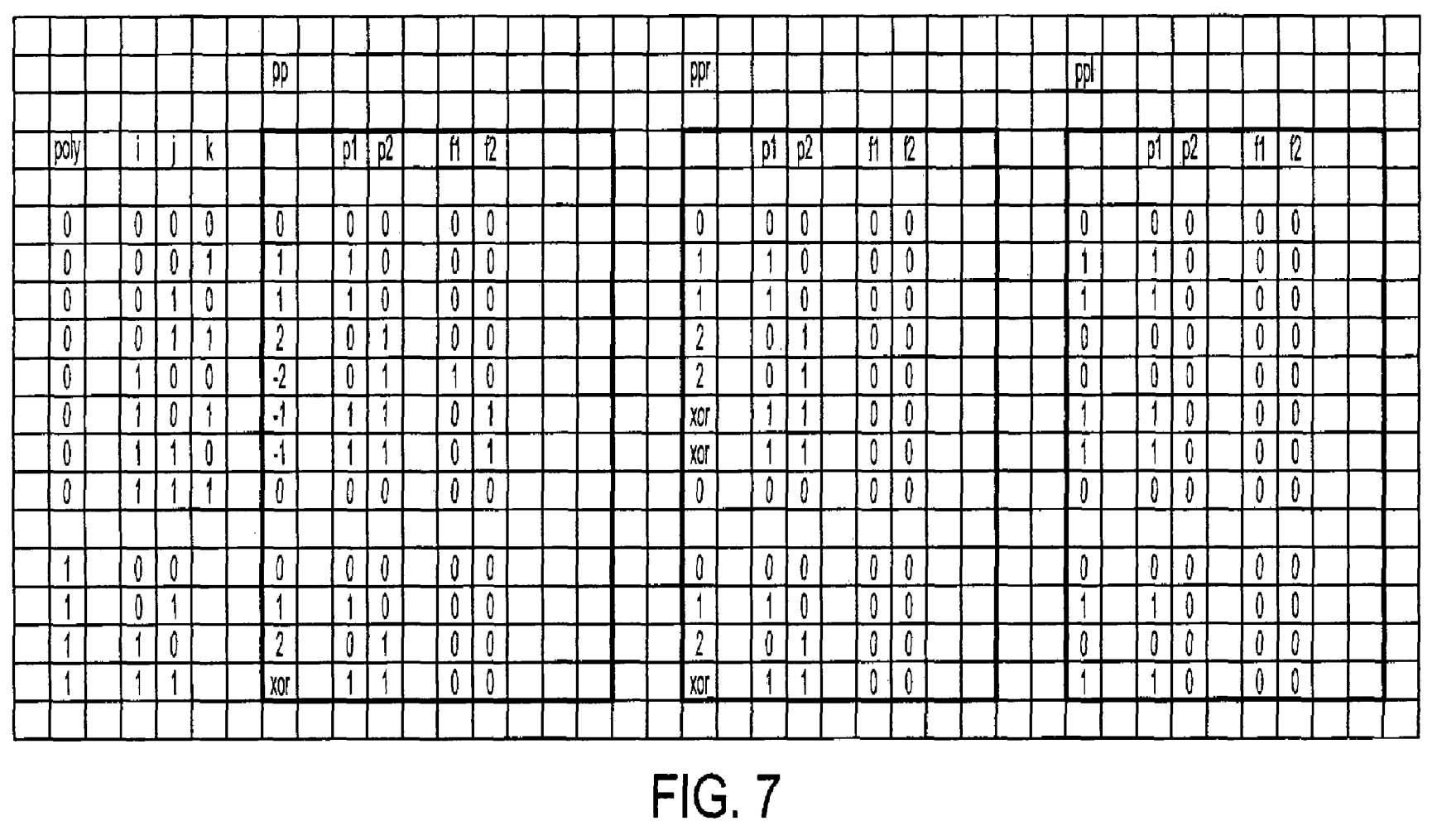

Booth byte multiply was used in the exemplary embodiment, because 5:2 is the largest Wallace tree that degenerates to a serial array adder, simplifying the partition multiplexing of high order and sign bits. The enhanced Booth circuitry of FIG. 3 eliminates multiplexing the low order bits, because disabling the fuse signal automatically converts the two low order partial product bits ppr and ppl to the logic functions (after carry ripple) shown in detail in FIG. 7 (here p1,p2 and f1,f2 are the AND and OR control inputs to the AOI Booth Multiplexor respectively, or the signals x1pass, x2pass, x1force, x2force respectively).

Preservation of internal accuracy enables ideal signal-noise ratios, and is especially valuable in algorithms such as Newton-Raphson or sigma-delta sensitive to zero crossings. When large products cancel, two different addition orders may differ at every bit, so precision simplifies logic verification.

The effective internal bandwidth of a lossless matrix multiplier, as referred to conventional vector units, is very high. A 16×16 matrix at 8b precision has 8+8+16 bits of multiply operands and 3×32 bits of add operands at each of 256 entries, or 32 K bits total. That amounts to effective internal bandwidth of 12.8 Tbits at 400 MHz. 16 and 32b lossless floating point is about the same bandwidth, because of the expansion of adder width. The wire counts between stages in FIG. 2 show how this design defers the full bandwidth cost until the late adder stages.

The exemplary embodiment demonstrates that the functional goals of the vector-matrix multiplier could be met with remarkably little logical overhead relative to more conventional multi-precision multipliers: the number of 4:2 stages is the same, the byte multiplicand delay is increased by a single 2:1 multiplexor, the Multiplicand Multiplexor is overlapped with Booth encode. The additional width of full internal precision is deferred to later stages.

Although the invention herein has been described as primarily a hardware implementation for illustration purposes, those of skill will recognize that the invention may be performed by one or more computational devices which capable of performing the calculation of the disclosed hardware devices. Moreover one of skill will recognize that the method of the present invention may encoded or embodied in software programs that may be carried on a recordable medium including digital recording medium such as an optical disc (such as a CD or DVD), magnetic disk or tape, and may be transmitted by a wireline or wireless communications devices in packetized or non-packetized form.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A method for operating a multiplier unit in a processor, the method comprising the steps of:
   receiving a multiplier operand, a multiplicand operand, and a polynomial specification signal;
   calculating a product based on the multiplier operand and the multiplicand operand, the product being one of an integer product or a polynomial product, depending on the polynomial specification signal, wherein calculation of the polynomial product is accelerated by applying a Booth multiplier operation that is enhanced to produce an XOR result of a plurality of bits of the multiplicand operand; and
   outputting the product calculated by the multiplier.

2. The method of claim 1, wherein the step of calculating the product includes producing partial products and calculating one of an integer product or polynomial product based on the partial products, and wherein the step of producing the partial product modifies a calculation of x1, x2 and negate selection signals using an enhanced Booth encoder, depending on the polynomial specification signal.

3. The method of claim 2 further comprising the steps of calculating x1, x2 and negate selection signals and recoding the x1, x2 and negate selection signals into x1pass, x1force, x2pass, and x2force signals.

4. The method of claim 3 further comprising the step of combining x1pass, x1force, x2pass, and x2force signals with multiplicand x2 signals producing a partial product.

5. The method of claim 4 further comprising the step of inhibiting the value of the x1force, x2pass and x2force signals at certain multiplexor locations to produce an alternate partial product.

6. The method of claim 1, wherein the step of calculating the product includes producing partial products, and further including the step of adding partial products in a partial products summation tree, in which the carry output of each full adder is inhibited to perform polynomial multiplication, depending on the polynomial specification signal.

7. The method of claim 6 further comprising the step of using a full adder that inhibits the carry output only sensitive to known non-zero inputs to the full adder, depending on the polynomial specification signal.

8. A multiplier unit in a processor comprising:
   a receiver which receives a multiplier operand, a multiplicand operand, and a polynomial specification signal;
   a multiplier that calculates a product based on the multiplier operand and the multiplicand operand, the product being one of an integer product or a polynomial product, depending on the polynominal specification signal, wherein calculation of the polynomial product is accelerated by applying a Booth multiplier operation that is enhanced to produce an XOR result of a plurality of bits of the multiplicand operand; and
   a transmitter that outputs the product calculated by the multiplier.

9. The multiplier unit of claim 8, wherein the multiplier includes a portion which produces partial products and a portion which calculates on of an integer product or polynominal product based on the partial products, and wherein the portion that produces partial products includes an enhanced Booth encoder that modifies a calculation of x1, x2 and negate selection signals, depending on the polynominal specification signal.

10. The multiplier unit of claim 9 further comprising a recoder that recodes the x1, x2 and negate selection signals into x1pass, x1force, x2pass, and x2force signals.

11. The multiplier unit of claim 10 further comprising an enhanced Booth multiplexor that combines the x1pass, x1force, x2pass, and x2force signals with multiplicand x1 and multiplicand x2 signals producing a partial product.

12. The multiplier unit of claim 11 further comprising a fusing circuit that inhibits the value of the x1force, x2pass and x2force signals at certain multiplexor locations to produce an alternate partial product.

13. The multiplier unit of claim 9 wherein the portion of the multiplier which calculates one of an integer product or polynominal product based on the partial products includes full adders in a partial product summation tree that inhibit the carry output to perform polynominal multiplication, depending on the polynominal specification signal.

14. The multiplier unit of claim 13 further comprising full adders that inhibit the carry output only sensitive to known non-zero inputs to the full adder.

\* \* \* \* \*